(12) United States Patent
Allione et al.

(10) Patent No.: US 9,671,618 B2
(45) Date of Patent: Jun. 6, 2017

(54) METHOD OF DETERMINING OPTICAL PARAMETERS OF AN OPHTHALMIC LENS

(71) Applicant: ESSILOR INTERNATIONAL (COMPAGNIE GENERALE D'OPTIQUE), Charenton le Pont (FR)

(72) Inventors: Pascal Allione, Charenton-le-Pont (FR); Jean-Pierre Chauveau, Charenton le Pont (FR); Daniel Steigelman, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 13 days.

(21) Appl. No.: 14/442,945

(22) PCT Filed: Nov. 13, 2013

(86) PCT No.: PCT/EP2013/073767
§ 371 (c)(1),
(2) Date: May 14, 2015

(87) PCT Pub. No.: WO2014/076155
PCT Pub. Date: May 22, 2014

(65) Prior Publication Data
US 2015/0286069 A1    Oct. 8, 2015

(30) Foreign Application Priority Data

Nov. 14, 2012   (EP) .................................... 12306415

(51) Int. Cl.
*G02C 7/02*    (2006.01)
*G02C 7/06*    (2006.01)
*G01M 11/02*   (2006.01)

(52) U.S. Cl.
CPC ............. *G02C 7/028* (2013.01); *G01M 11/02* (2013.01); *G01M 11/025* (2013.01); *G02C 7/027* (2013.01); *G02C 7/061* (2013.01)

(58) Field of Classification Search
CPC ........ G02C 7/024; G02C 7/027; G02C 7/028; G02C 7/06; G02C 7/061; G02C 7/063; G01M 11/02; G01M 11/025
(Continued)

(56) References Cited

U.S. PATENT DOCUMENTS

2010/0250173 A1*  9/2010  Kozu ................. G01M 11/0257
                                                            702/82
2012/0113388 A1*  5/2012  Back ........................ G02C 7/02
                                                          351/159.74
(Continued)

FOREIGN PATENT DOCUMENTS

EP         2 369 319       9/2011
WO       WO 99/66308      12/1999

*Primary Examiner* — Jordan Schwartz
(74) *Attorney, Agent, or Firm* — Cozen O'Connor

(57) ABSTRACT

Method for determining the values of a set of n optical parameters ($P_1, P_2, \ldots, P_n$) of an ophthalmic lens, n being an integer greater than or equal to 1, the method comprising: an nominal ophthalmic lens data providing step, an ophthalmic lens providing step, an optical surface measuring step, a surface errors determining step during which a set of m surface error parameters ($\alpha_1, \alpha_2, \ldots, \alpha_m$) is determined, m being an integer greater than or equal to 1, an optical parameter determining step during which each optical parameter of the set of optical parameters is determined by:

$$P_i = P_{i,0} + \left[\sum_{j=1}^{m}\left(\frac{\partial P_i}{\partial \alpha_j}\right)_0 \times \Delta\alpha_j\right] + A_i$$

(Continued)

with $P_i$ the value of the ith optical parameter of the manufactured optical lens, $P_{i,0}$ the value of the ith optical parameter of the nominal optical lens, $$\left(\frac{\partial P_i}{\partial \alpha_j}\right)_0$$

the value of the derivative of $P_i$ with respect to the jth surface error parameter $\alpha_j$ on the nominal surface and $\Delta\alpha_j$ the value of the jth surface error parameter, and $A_i$ a combination of terms of order greater or equal to 2 for each $P_i$.

15 Claims, 6 Drawing Sheets

(58) Field of Classification Search
USPC .......................... 351/159.73, 159.74, 159.75
See application file for complete search history.

(56) References Cited

U.S. PATENT DOCUMENTS

| | | | |
|---|---|---|---|
| 2013/0179297 A1* | 7/2013 | Yamakaji | G02C 7/025 705/26.5 |
| 2014/0085627 A1* | 3/2014 | Chauveau | B24B 13/00 356/124 |

* cited by examiner

| Pfv_45 (D) | Pfv_30 (D) | Pfv_60 (D) | Pnv_45 (D) | Pnv_30 (D) | Pnv_60 (D) | Dh_prp (Dpri) | Dv_prp (Dpri) | |
|---|---|---|---|---|---|---|---|---|
| 2.28E-05 | -6.15E-04 | 6.61E-04 | 2.91E-03 | 2.16E-03 | 3.67E-03 | 3.07E-01 | 7.34E-04 | D_Tx (mm) |
| 7.40E-03 | 6.64E-03 | 8.15E-03 | -1.68E-02 | -1.36E-02 | -2.00E-02 | 7.34E-04 | 3.01E-01 | D_Ty (mm) |
| -1.73E-02 | -1.76E-02 | -1.71E-02 | 7.44E-03 | 6.24E-04 | 1.43E-02 | -2.20E-06 | -9.67E-04 | D_Tz (mm) |
| 2.39E-02 | 1.97E-02 | 2.80E-02 | -6.40E-02 | -4.87E-02 | -7.92E-02 | -4.91E-05 | 8.59E-01 | D_Rx (deg) |
| 3.40E-05 | -3.88E-03 | 3.94E-03 | -1.14E-02 | -7.34E-03 | -1.55E-02 | -8.69E-01 | 4.63E-05 | D_Ry (deg) |
| 2.08E-06 | -1.48E-04 | 1.52E-04 | -5.50E-04 | 1.37E-05 | -1.11E-03 | -2.29E-02 | -3.16E-05 | D_Rz (deg) |
| -5.69E-01 | -8.54E-01 | -2.85E-01 | -5.84E-01 | -8.47E-01 | -3.21E-01 | -2.02E-07 | 2.89E-12 | D_xx (su) |
| 2.46E-05 | -2.91E-01 | -2.91E-01 | -2.26E-03 | -1.33E-01 | 1.29E-01 | 5.84E-03 | -2.12E-07 | D_xy (su) |
| -5.77E-01 | -8.74E-01 | -2.80E-01 | -5.67E-01 | -2.86E-01 | -8.48E-01 | -2.42E-07 | 1.16E-02 | D_yy (su) |

Figure 10

| Pfv_45 (D) | Pfv_30 (D) | Pfv_60 (D) | Pnv_45 (D) | Pnv_30 (D) | Pnv_60 (D) | Dh_prp (Dpri) | Dv_prp (Dpri) | |
|---|---|---|---|---|---|---|---|---|
| 5.57E-03 | 7.38E-03 | 3.76E-03 | -5.47E-03 | -8.88E-03 | -2.06E-03 | 4.12E-01 | 1.09E-01 | D_Tx (mm) |
| 6.94E-03 | 8.81E-03 | 5.07E-03 | -1.48E-02 | -1.50E-02 | -1.47E-02 | 1.10E-01 | 2.73E-01 | D_Ty (mm) |
| -1.80E-02 | -1.84E-02 | -1.77E-02 | 1.36E-02 | 5.63E-03 | 2.16E-02 | 6.28E-05 | 7.55E-06 | D_Tz (mm) |
| 2.00E-02 | 1.97E-02 | 2.03E-02 | -6.64E-02 | -5.64E-02 | -7.65E-02 | -9.21E-03 | 8.57E-01 | D_Rx (deg) |
| -1.49E-03 | -4.31E-03 | 1.33E-03 | -7.73E-03 | -5.33E-03 | -2.08E-02 | -8.54E-01 | 9.10E-03 | D_Ry (deg) |
| 6.76E-05 | 1.58E-04 | -2.25E-05 | -1.47E-04 | 2.08E-03 | -2.37E-03 | -3.95E-02 | 3.90E-04 | D_Rz (deg) |
| -5.69E-01 | -7.11E-01 | -4.28E-01 | -5.83E-01 | -7.32E-01 | -4.34E-01 | -8.68E-05 | 3.01E-07 | D_xx (su) |
| 8.42E-03 | -2.43E-01 | 2.60E-01 | 1.40E-02 | -2.39E-01 | 2.68E-01 | 1.24E-02 | -8.63E-05 | D_xy (su) |
| -5.82E-01 | -4.23E-01 | -7.42E-01 | -5.64E-01 | -3.82E-01 | -7.46E-01 | -8.81E-05 | 2.47E-02 | D_yy (su) |

Figure 11

METHOD OF DETERMINING OPTICAL PARAMETERS OF AN OPHTHALMIC LENS

RELATED APPLICATIONS

This is a U.S. national stage under 35 USC §371 of application No. PCT/EP2013/073767, filed on Nov. 13, 2013. This application claims the priority of European application no. 12306415.6 filed Nov. 14, 2012, the entire content of which is hereby incorporated by reference.

FIELD OF THE INVENTION

The invention relates to a method for determining the values of a set of n optical parameters (P1, P2, ..., Pn) of an ophthalmic lens and a method for controlling a lens manufacturing process.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

An optical lens is typically made of plastic or glass material and generally has two opposite surfaces which co-operate with one another to provide a required corrective prescription. When the positioning or shape of one of these surfaces with respect to the other is inaccurate, optical errors can be created.

Manufacturing of an optical lens to the required prescription requirements typically includes machining the surface of a semi-finished lens or lens blank. Typically, a semi-finished lens has a finished surface, for example the front surface and an unfinished surface, for example the back surface. By machining the back surface (also named "rear surface") of the lens to remove material, the required shape and positioning of the back surface with respect to the front surface for the desired corrective prescription can be generated.

Optical lenses, and in particular ophthalmic lenses, require very high quality manufacturing process in order to obtain high quality optical lenses.

Controlling the quality of the produced lenses is a complex task.

One solution consists in measuring the surface that has been manufactured to try to compare such surface with the nominal surface to be manufactured.

Such solution presents some drawbacks.

First, such solution considers the manufactured surface whereas the quality of an ophthalmic lens is better quantified by the optical function of the ophthalmic lens.

Secondly, not only the shape of the manufactured surface but also the position of the manufactured surface with respect to the opposite surface of the ophthalmic lens has a strong impact on the overall optical quality of the ophthalmic lens. Being able to determine the position and shape of the manufactured surface is not straightforward from the measurements of such manufactured surface.

Another solution consists in measuring the full optical function of each manufactured optical lens. Such solution is very time consuming and therefore expensive because it involves dedicated measurement tools and setups.

SUMMARY OF THE INVENTION

Therefore, there is a need to improve such lens quality analyzing methods in order to strengthen the control of the manufacturing process and the quality of manufactured lenses. Thus, an object of the present invention is to provide such an improved method.

To this end, one aspect of the invention is directed to a method, for example implemented by computer means, for determining the values of a set of n optical parameters ($P_1$, $P_2$, ..., $P_n$) of an ophthalmic lens, n being an integer greater than or equal to 1, the method comprising:

- an nominal ophthalmic lens data providing step during which nominal data representing an nominal ophthalmic lens is provided,
- an ophthalmic lens providing step during which an ophthalmic lens is provided, the ophthalmic lens comprising at least two optical surfaces at least one of which is manufactured based on the corresponding surface of the nominal ophthalmic lens also named "nominal surface",
- an optical surface measuring step during which the at least one manufactured surface of the ophthalmic lens is measured,
- a surface errors determining step during which a set of m surface error parameters ($\alpha_1$, $\alpha_2$, ..., $\alpha_m$) is determined, m being an integer greater than or equal to 1, the surface error parameters representing the differences in position and/or shape of the measured optical surface and the corresponding surface of the nominal ophthalmic lens,
- an optical parameter determining step during which each optical parameter of the set of optical parameters is determined by:

$$P_i = P_{i,0} + \left[ \sum_{j=1}^{m} \left( \frac{\partial P_i}{\partial \alpha_j} \right)_0 \times \Delta \alpha_j \right] + A_i$$

with $P_i$ the value of the ith optical parameter of the manufactured optical lens, $P_{i,0}$ the value of the ith optical parameter of the nominal optical lens, $$\left( \frac{\partial P_i}{\partial \alpha_j} \right)_0$$

the value of the derivative of $P_i$ with respect to the jth surface error parameter $\alpha_j$ on the nominal surface and $\Delta \alpha_j$ the value of the jth surface error parameter, and $A_i$ a combination of terms of order greater or equal to 2 for each $P_i$.

Advantageously, the method according to an embodiment of the invention allows determining a set of optical parameters of a manufactured optical lens by simply measuring the manufactured surface and considering the nominal ophthalmic lens. A lens surface measurement is much less time and cost consuming than a lens optical measurement.

Therefore, the method according to an embodiment of the invention allows by simply measuring the manufactured surface of an ophthalmic lens determining optical parameters of the ophthalmic lens. Such optical parameters may then be compared to their nominal values and one can check if the quality of the manufactured ophthalmic lens is acceptable, for example based on international quality standards.

According to further embodiments which can be considered alone or in any possible combination:

during the optical parameter determining step at least part, for example all, of the optical parameters are determined by having:

$$A_i = \frac{1}{2}\left[\sum_{j,k=1}^{m}\left(\frac{\partial^2 P_i}{\partial\alpha_j\partial\alpha_k}\right)_0 \times \Delta\alpha_j \times \Delta\alpha_k\right]$$

with $$\left(\frac{\partial^2 P_i}{\partial\alpha_j\partial\alpha_k}\right)_0$$

the value of the second derivative of $P_i$ with respect to the jth surface error parameter $\alpha_j$ and the kth surface error parameter $\alpha_k$ on the nominal surface, $\Delta\alpha_j$ the value of the jth surface error parameter and $\Delta\alpha_k$ the value of the kth surface error parameter; and/or during the optical parameter determining step at least part, for example all, of the optical parameters are determined by having $A_i=0$; and/or the ophthalmic lens is a progressive multifocal ophthalmic lens; and/or the manufactured surface is a non-symmetric surface; and/or at least one optical parameter is determined, for example all optical parameters are determined, under specific conditions defined by at least a reference point out of the ophthalmic lens and the position and orientation of the ophthalmic lens with respect to the reference point; and/or the ophthalmic lens is adapted for a wearer; and/or the ophthalmic lens is adapted for a wearer and at least one optical parameter is determined, for example all optical parameters are determined, under given wearing conditions defined by at least a position of one of the surfaces of the ophthalmic lens, for example the rear surface of the ophthalmic lens, with respect to a position of the center of rotation of the eye of the wearer and a pantoscopic angle and a wrap angle of the ophthalmic lens; and/or the wearing conditions are defined from measurements on the wearer and a spectacle frame chosen by the wearer; and/or at least one optical parameter is determined, for example all optical parameters are determined, under usual wearing conditions with a primary viewing direction of the wearer intersecting the fitting cross (CM) of the ophthalmic lens, a distance between the center of rotation of the eye and the rear face of the ophthalmic lens of 27 mm, the pantoscopic angle of 8° and the wrap angle of 0°; and/or at least one optical parameter is determined, for example all optical parameters are determined, with the ophthalmic lens in a position with relation to the eye of the wearer, defined by the pantoscopic angle of 8°, a lens-pupil distance of 12 mm, a pupil-eye rotation center distance of 13.5 mm and the wrap angle of 0°; and/or at least one optical parameter is a local optical parameter, for example the at least one optical parameter is selected among the list consisting of: spherical power, astigmatism amplitude and axis, vertical prismatic deviation, horizontal prismatic deviation, total prismatic deviation; and/or at least one optical parameter is selected in the list of optical parameter defined in one of the standards ISO 8980-1, ISO 8980-2, and ISO 21987; and/or at least one optical parameters is defined at at least one reference point of the ophthalmic lens, for example the at least one reference point is selected among the list consisting of: the near vision point, the far vision point, the prism reference point, the fitting cross; and/or at least one optical parameter is a global optical parameter; and/or the global parameter is defined on a zone corresponding to the intersection of a cone and one of the surfaces of the ophthalmic lens, the axis of the cone passing through the a first reference point out of the ophthalmic lens and a second reference, point located on one of the surfaces of the ophthalmic lens, for example the near vision point, the far vision point, the prism reference point or the fitting cross, the aperture of the cone being greater than or equal to 5°, for example greater than or equal to 10°, and smaller than or equal to 20°, for example smaller than or equal to 15°; and/or the ophthalmic lens is adapted for a wearer and the cone is a vision cone, the first reference point is the center of rotation of the eye of the wearer; and/or the nominal ophthalmic lens data represent the nominal ophthalmic lens in a nominal frame of reference; and/or the measured manufactured surface of the ophthalmic lens is expressed in the nominal frame of reference; and/or the ophthalmic lens is adapted for a wearer and the nominal frame of reference is linked to the wearer; and/or during the surface errors determining step, the method further comprises:

a deformation surface providing step during which at least one deformation surface defined by at least one surface error parameter $(\alpha_j)$ is provided, a composed surface determining step during which a composed surface is determined by adding the measured manufactured surface and the at least one deformation surface, a surface error parameter determining step during which the values of surface error parameters $(\Delta\alpha_j)$ are determined by minimizing the difference between the nominal surface and the composed surface; and/or the surface error parameter determining step further comprises a zone determining step in which a zone of interest is determined in the nominal surface and the surface error parameters are determined by minimizing the difference between the nominal surface and the composed surface in the zone of interest; and/or the parameter determining step is implemented by using a damped least squares process; and/or the surface error parameters comprise at least six position parameters, for example three translation parameters ($T_x$, $T_y$, $T_z$) and three rotation parameters ($R_x$, $R_y$, $R_z$) of the at least one manufactured surface of the ophthalmic lens with respect to the nominal surface; and/or the deformation surface corresponds to a sphero-torus surface defined by a sphere parameter, a cylinder parameter and an axis parameter; and/or the deformation surface corresponds to a right circular cone defined by an axis parameter and an angle parameter.

Another aspect of the invention relates to a method for controlling a lens manufacturing process wherein the lens manufacturing process comprises in addition to the above-mentioned steps of the method according to an aspect of the invention:

prior to the ophthalmic lens providing step a manufacturing step during which the ophthalmic lens is manufactured and after the optical parameter determining step, a control step during which the value of the optical parameters are controlled by comparing them to the values of the optical parameters of the nominal ophthalmic lens.

Another aspect of the invention relates to a method for controlling a lens manufacturing process comprising the steps of:
a) manufacturing a master lens according to a manufacturing process using a manufacturing device,
b) determining by the method according to the invention at least one optical parameter of the master lens of step a),
c) recording the value of the at least one optical parameter,
d) repeating regularly step a) to c) and checking the evolution of the at least one optical parameter over time,
wherein the evolution of at least one parameter of the manufacturing device used during the lens manufacturing process is checked over time and the evolution over time of at least one optical parameter of the master lens is related with the evolution over time of the at least one parameter of the manufacturing device.

According to a further aspect, the invention relates to a computer program product comprising one or more stored sequences of instructions that are accessible to a processor and which, when executed by the processor, causes the processor to carry out the steps of the method according to an embodiment of the invention.

Another aspect of the invention relates to a computer readable medium carrying one or more sequences of instructions of the computer program product according to an embodiment of the invention.

Another aspect of the invention relates to a program which makes a computer execute the method according to an embodiment of the invention.

Another aspect of the invention also relates to a computer-readable storage medium having a program recorded thereon; where the program makes the computer execute the method according to an embodiment of the invention.

Another aspect of the invention relates to a device comprising a processor adapted to store one or more sequence of instructions and to carry out at least one of the steps of the method according to an embodiment of the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawing in which:

FIG. 10 is a table illustrating an example of implementation of the invention, and FIG. 11 is a table illustrating a further example of implementation of the invention.

DETAILED DESCRIPTION OF THE DRAWINGS

A progressive lens comprises at least one but preferably two non-rotationally symmetrical aspheric surfaces, for instance but not limited to, progressive surface, regressive surface, toric or atoric surfaces.

As is known, a minimum curvature $CURV_{min}$ of a surface is defined at any point on said surface by the formula:

$$CURV_{min} = \frac{1}{R_{max}}$$

where $R_{max}$ is the maximum radius of curvature of the surface, expressed in meters and $CURV_{min}$ is expressed in dioptres.

Similarly, a maximum curvature $CURV_{max}$ of a surface can be defined at any point on the surface by the formula:

$$CURV_{max} = \frac{1}{R_{min}}$$

where $R_{min}$ is the minimum radius of curvature of the surface, expressed in meters and $CURV_{max}$ is expressed in dioptres.

It can be noticed that when the surface is locally spherical, the minimum radius of curvature $R_{min}$ and the maximum radius of curvature $R_{max}$ are identical and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions are the following:

$$SPH_{min} = (n-1) * CURV_{min} = \frac{n-1}{R_{max}} \text{ and}$$

$$SPH_{max} = (n-1) * CURV_{max} = \frac{n-1}{R_{min}}$$

where n is the refractive index of the constituent material of the lens.

If the surface considered is an eyeball side surface (also referred to as the back surface), the expressions are the following:

$$SPH_{min} = (1-n) * CURV_{min} = \frac{1-n}{R_{max}} \text{ and } SPH_{max} = (1-n) * CURV_{max} = \frac{1-n}{R_{min}}$$

where n is the refractive index of the constituent material of the lens.

As is well known, a mean sphere $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula $CYL=|SPH_{max}-SPH_{min}|$.

The characteristics of any aspherical face of the lens may be expressed by the local mean spheres and cylinders. A surface can be considered as locally aspherical when the cylinder is at least 0.25 diopters.

Figure 1:
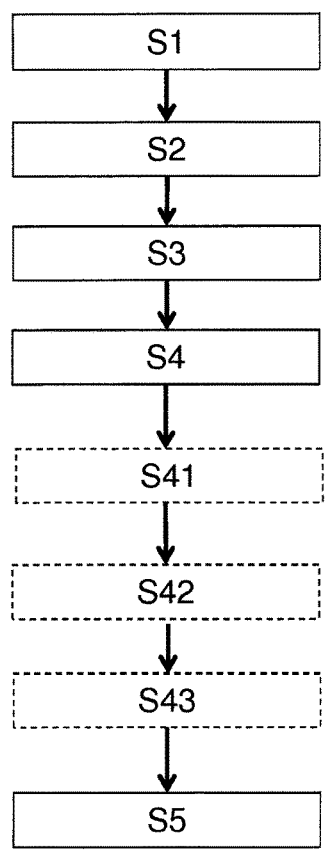
FIG. 1 is flowchart representing the steps of a method according to an embodiment of the invention.
Figure 2:
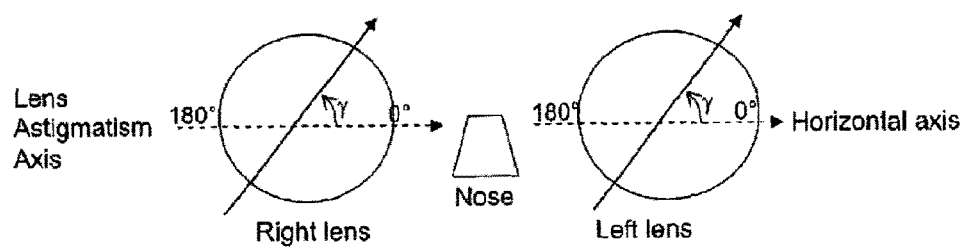
FIG. 2 illustrates the astigmatism axis γ of a lens in the TABO convention.
Figure 3:
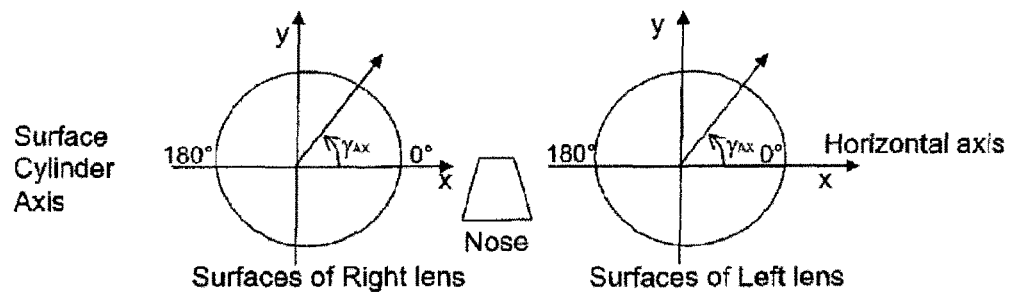
FIG. 3 illustrates the cylinder axis $\gamma_{AX}$ in a convention used to characterize an aspherical surface.

For an aspherical surface, a local cylinder axis $\gamma_{AX}$ may further be defined. FIG. 2 illustrates the astigmatism axis $\gamma$ as defined in the TABO convention and FIG. 3 illustrates the cylinder axis $\gamma_{AX}$ in a convention defined to characterize an aspherical surface.

The cylinder axis $\gamma_{AX}$ is the angle of the orientation of the maximum curvature $CURV_{max}$ with relation to a reference axis and in the chosen sense of rotation. In the above defined convention, the reference axis is horizontal (the angle of this reference axis is 0°) and the sense of rotation is counter-clockwise for each eye, when looking at the wearer (0°≤$\gamma_{AX}$≤180°). An axis value for the cylinder axis $\gamma_{AX}$ of +45° therefore represents an axis oriented obliquely, which when looking at the wearer, extends from the quadrant located up on the right to the quadrant located down on the left.

Figure 4:
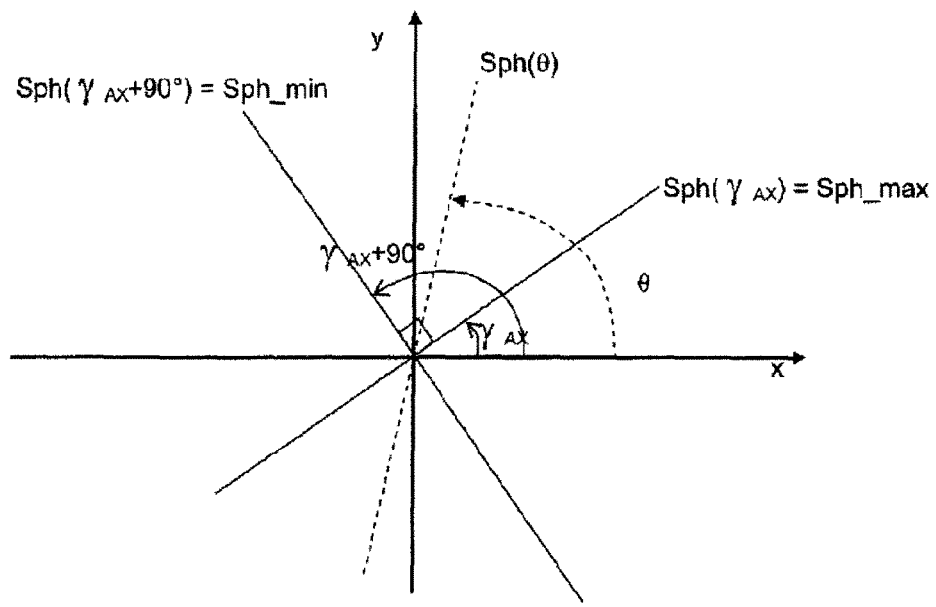
FIG. 4 illustrates the local sphere along any axis.

In addition, based on the knowledge of the value of the local cylinder axis $\gamma_{AX}$. Gauss formula enables to express the local sphere SPH along any axis θ, θ being a given angle in the referential defined in FIG. 3. The axis θ is shown in FIG. 4. $SPH(\theta)=SPH_{max} \cos^2(\theta-\gamma_{AX})+SPH_{min} \sin^2(\theta-\gamma_{AX})$ As expected, when using the Gauss formula, SPH ($\gamma_{AX}$)= $SPH_{max}$ and SPH ($\gamma_{AX}$+90°)=$SPH_{min}$.

A surface may thus be locally defined by a triplet constituted by the maximum sphere $SPH_{max}$, the minimum sphere $SPH_{min}$ and the cylinder axis $\gamma_{AX}$. Alternatively, the triplet may be constituted by the mean sphere $SPH_{mean}$, the cylinder CYL and the cylinder axis $\gamma_{AX}$.

Figure 5:
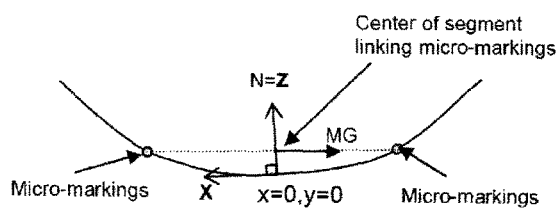
FIGS. 5 and 6 show referential defined with respect to micro-markings, for a surface bearing micro-markings and for a surface not bearing the micro-markings respectively.
Figure 6:
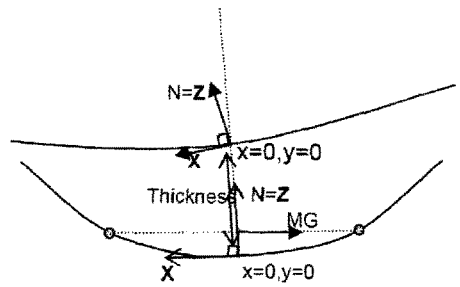

Whenever a lens is characterized by reference to one of its aspherical surfaces, a referential is defined with respect to micro-markings as illustrated in FIGS. 5 and 6, for a surface bearing micro-markings and for a surface not bearing any micro-markings respectively.

Progressive lenses comprise micro-markings that have been made mandatory by a harmonized standard ISO 8990-2. Temporary markings may also be applied on the surface of the lens, indicating diopter measurement positions (sometimes referred to as control points) on the lens, such as for far vision and for near vision, a prism reference point and a fitting cross for instance. It should be understood that what is referred to herein by the terms far vision diopter measurement position ("FV position") and near vision diopter measurement position ("NV position") can be any one of the points included in the orthogonal projection on the first surface of the lens, of respectively the FV and NV temporary markings provided by the lens manufacturer. If the temporary markings are absent or have been erased, it is always possible for a skilled person to position such control points on the lens by using a mounting chart and the permanent micro-markings.

The micro-markings also make it possible to define referential for both surfaces of the lens.

FIG. 5 shows the referential for the surface bearing the micro-markings. The center of the surface (x=0, y=0) is the point of the surface at which the normal N to the surface intersects the center of the segment linking the two micro-markings. MG is the collinear unitary vector defined by the two micro-markings. Vector Z of the referential is equal to the unitary normal (Z=N); vector Y of the referential is equal to the vector product of Z by MG; vector X of the referential is equal to the vector product of Y by Z. {X, Y, Z} thereby form a direct orthonormal trihedral. The center of the referential is the center of the surface x=0 mm, y=0 mm. The X axis is the horizontal axis and the Y axis is the vertical axis as it shown in FIG. 3.

FIG. 6 shows the referential for the surface opposite to the surface bearing the micro-markings. The center of this second surface (x=0, y=0) is the point at which the normal N intersecting the center of the segment linking the two micro-markings on the first surface intersects the second surface. Referential of the second surface is constructed the same way as the referential of the first surface, i.e. vector Z is equal to the unitary normal of the second surface; vector Y is equal to the vector product of Z by MG; vector X is equal to the vector product of Y by Z. As for the first surface, the X axis is the horizontal axis and the Y axis is the vertical axis as it shown in FIG. 3. The center of the referential of the surface is also x=0 mm, y=0 mm.

Similarly, on a semi-finished lens blank, standard ISO 10322-2 requires micro-markings to be applied. The center of the machined surface of a semi-finished lens blank can therefore be determined as well as a referential as described above.

Figure 7:
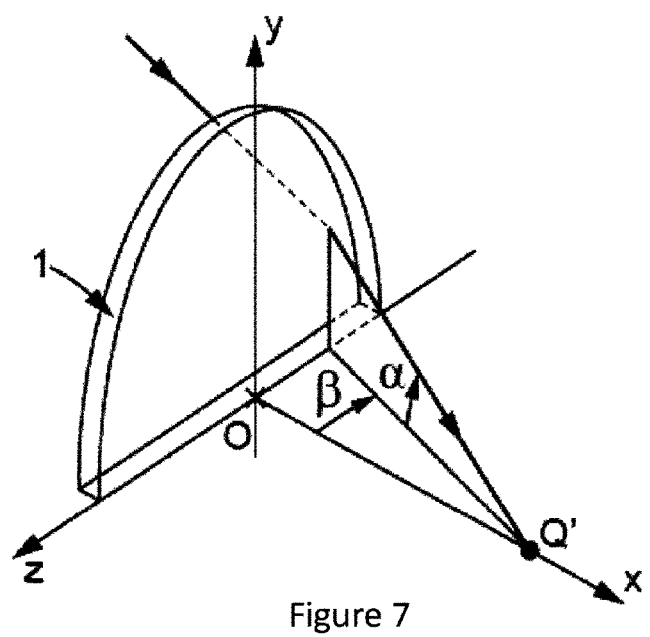
FIGS. 7 and 8 show, diagrammatically, optical systems of eye and lens.
Figure 8:
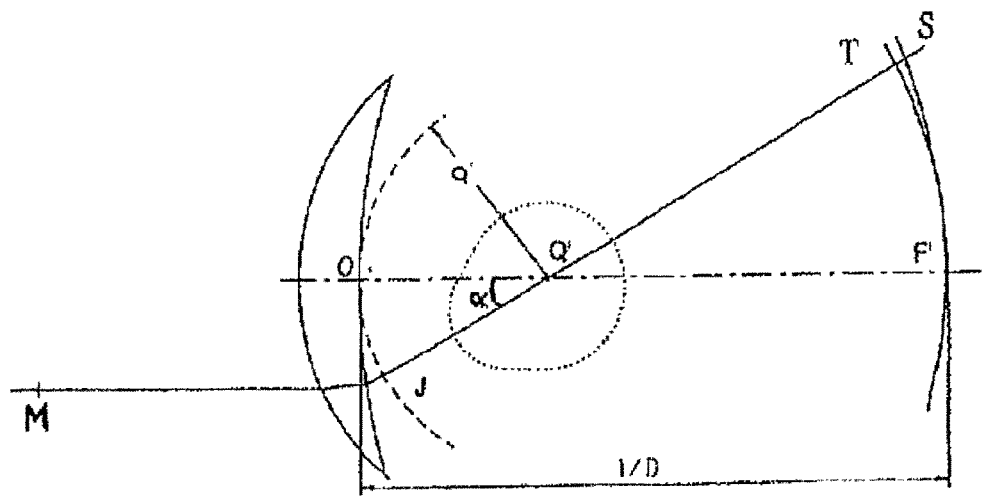

FIGS. 7 and 8 are diagrammatic illustrations of optical systems of eye and lens, thus showing the definitions used in the description. More precisely, FIG. 7 represents a perspective view of such a system illustrating parameters α and β used to define a gaze direction. FIG. 8 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 8 in a dot-dash line, is the horizontal axis passing through the center of rotation of the eye and extending in front of the wearer—that is the axis Q'F' corresponding to the primary gaze view. This axis cuts the back surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 7—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 7. The angle α is the angle formed between the axis Q'J and the projection of the straight line Q'J on the horizontal plane comprising the axis Q'F'; this angle appears on the scheme on FIGS. 7 and 8. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the apex sphere:

ProxO=1/MJ

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

Pui=ProxO+ProxI

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame $\{Q', x_m, y_m, z_m\}$ linked to the eye. It corresponds to the angle with which the image S or T is formed depending on the convention used with relation to the direction $z_m$ in the plane $\{Q', z_m, y_m\}$.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng. Standard wearing conditions are to be understood as the position of the lens with relation to the eye of a standard wearer, notably defined by a pantoscopic angle of −8°, a lens-pupil distance of 12 mm, a pupil-eye rotation center of 13.5 mm and a wrap angle of 0°. The pantoscopic angle is the angle in the vertical plane between the optical axis of the spectacle lens and the visual axis of the eye in the primary position, usually taken to be the horizontal. The wrap angle is the angle in the horizontal plane between the optical axis of the spectacle lens and the visual axis of the eye in the primary position, usually taken to be the horizontal. Other conditions may be used. Wearing conditions may be calculated from a ray-tracing program, for a given lens. Further, the optical power and the astigmatism may be calculated so that the prescription is either fulfilled at the reference points (i.e control points in far vision) and for a wearer wearing his spectacles in the wearing conditions or measured by a frontofocometer.

Figure 9:
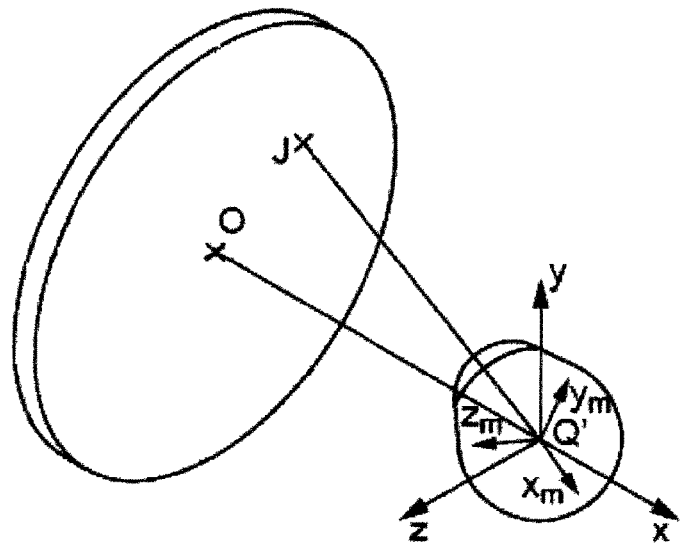
FIG. 9 shows a ray tracing from the center of rotation of the eye.

FIG. 9 represents a perspective view of a configuration wherein the parameters α and β are non zero. The effect of rotation of the eye can thus be illustrated by showing a fixed frame {x, y, z} and a frame {$x_m$, $y_m$, $z_m$} linked to the eye. Frame {x, y, z} has its origin at the point Q'. The axis x is the axis Q'O and it is oriented from the lens toward the eye. The y axis is vertical and oriented upwardly. The z axis is such that the frame {x, y, z} be orthonormal and direct. The frame {$x_m$, $y_m$, $z_m$} is linked to the eye and its center is the point Q'. The $x_m$ axis corresponds to the gaze direction JQ'. Thus, for a primary gaze direction, the two frames {x, y, z} and {$x_m$, $y_m$, $z_m$} are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'. The value in surface terms can be expressed with relation to points. The points are located with the help of abscissa or ordinate in a frame as defined above with respect to FIGS. 3, 5 and 6.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—back surface or front surface.

The above description made with reference to FIGS. 7-9 was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

In the remainder of the description, terms like <<up>>, <<bottom>>, <<horizontal>>, <<vertical>>, <<above>>, <<below>>, or other words indicating relative position may be used. These terms are to be understood in the wearing conditions of the lens. Notably, the "upper" part of the lens corresponds to a negative lowering angle α<0° and the "lower" part of the lens corresponds to a positive lowering angle α>0°. Similarly, the "upper" part of the surface of a lens—or of a semi-finished lens blank—corresponds to a positive value along the y axis, and preferably to a value along the y axis superior to the y_value at the fitting cross and the "lower" part of the surface of a lens—or of a semi-finished lens blank—corresponds to a negative value along the y axis in the frame as defined above with respect to FIGS. 3, 5 and 6, and preferably to a value along the y axis inferior to the y_value at the fitting cross.

The method according to the invention is a method for determining the values of a set of n optical parameters ($P_1$, $P_2$, . . . , $P_n$) of an ophthalmic lens, n being an integer greater than or equal to 1.

According to different embodiments of the invention, the ophthalmic lens may be a single vision ophthalmic lens, a multifocal ophthalmic lens, or a progressive multifocal ophthalmic lens.

According to an embodiment of the invention, the ophthalmic lens may be a master lens. The master lens is a lens that is not intended to be worn by a wearer. For example the master lens may have different geometrical and/or optical parameter and/or is made of a different material than the lenses intended to be worn by a wearer.

For example, the master lens is made of a material and has a design such as its optical parameters are more sensible to a modification of the process parameter that the usual manufactured lenses.

According to an embodiment of the invention, the ophthalmic lens may be adapted for a wearer; in particular the ophthalmic lens may be adapted to the prescription of the wearer.

According to an embodiment at least one optical parameter $P_i$ is determined, for example all optical parameters ($P_1$, $P_2$, . . . , $P_n$) are determined, under specific conditions defined by at least a reference point out of the ophthalmic lens and the position and orientation of the ophthalmic lens with respect to the reference point.

The specific conditions may be wearing conditions and the reference point may represent a center of rotation of an eye of a wearer. The position and orientation of the ophthalmic lens may be defined by the position the position of one of the surfaces of the ophthalmic lens, for example the rear surface of the ophthalmic lens, with respect to a position of the center of rotation of the eye of the wearer and a pantoscopic angle and a wrap angle of the ophthalmic lens.

According to an embodiment in which the ophthalmic lens is adapted for a wearer, the wearing conditions may be obtained by specific measurements on the wearer, thus increasing the accuracy of the method according to the invention.

Usual wearing conditions may also be used to define at least one, for example all, of the optical parameters.

Usual wearing conditions may be defined by a primary viewing direction of the wearer intersecting the fitting cross of the ophthalmic lens, a distance between the center of rotation of the eye and the rear face of the ophthalmic lens of 27 mm, the pantoscopic angle of 8° and the wrap angle of 0°.

Alternatively, usual wearing conditions may be defined considering the pupil of the wearer. Such wearing conditions may be defined by a pantoscopic angle of 8°, a lens-pupil distance of 12 mm, a pupil-eye rotation center distance of 13.5 mm and a wrap angle of 0°.

According to an embodiment, at least one optical parameter is a local optical parameter. For example the optical parameters may be selected among the list consisting spherical power, astigmatism amplitude and axis, vertical prismatic deviation, horizontal prismatic deviation, total prismatic deviation.

Other examples of optical parameters are defined in the ISO standard:
  ISO 8980-1 for none edged single vision ophthalmic lenses, or ISO 8980-2 for none edged multifocal ophthalmic lenses, or ISO 21987 for edged ophthalmic lenses.

Each local optical parameter can be defined at a reference point. For example, for a multifocal ophthalmic lens, the reference point may be selected in the list consisting of: the near vision point, the far vision point, the prism reference point, the fitting cross.

According to an embodiment, at least one optical parameter is a global optical parameter.

The global optical parameter is defined on a zone corresponding to the intersection of a cone and one of the surfaces of the ophthalmic lens. The axis of the cone passes through a first and second reference points. The first reference point is a point situated out of the ophthalmic lens and the second reference is point located on one of the surfaces of the ophthalmic lens.

The cone may be a vision cone and the first reference point is than the center of rotation of the eye. For example, if the ophthalmic lens is adapted to a wearer, the first reference point may correspond to the center of rotation of the eye of the wearer.

The second reference point may be in the case of a multifocal ophthalmic lens the near vision point, the far vision point, the prism reference point or the fitting cross.

According to an embodiment, the aperture of the cone is greater than or equal to 5°, for example greater than or equal to 10°, and smaller than or equal to 20°, for example smaller than or equal to 15°.

According to an embodiment of the invention, the method of the invention may comprise:
an nominal ophthalmic lens data providing step S1,
an ophthalmic lens providing step S2
an optical surface measuring step S3
a surface errors determining step S4, and
an optical parameter determining step S5.

During the nominal ophthalmic lens data providing step S1, nominal data representing a nominal ophthalmic lens is provided.

The nominal data may represent the nominal ophthalmic in a nominal frame of reference.

According to an embodiment in which the ophthalmic lens is adapted to the wearer, such nominal frame of reference may be linked to the wearer.

During the ophthalmic lens providing step S2, an ophthalmic lens is provided. The ophthalmic lens comprises at least two optical surfaces at least one of which is manufactured based on the corresponding surface of the nominal ophthalmic lens also named "nominal surface".

During the optical surface measuring step S3, at least one manufactured surface of the ophthalmic lens is measured.

According to an embodiment of the invention, the measured manufactured surface of the ophthalmic lens is expressed in the nominal frame of reference used to express the nominal ophthalmic lens.

During the surface errors determining step S4, a set of m surface error parameters ($\alpha_1, \alpha_2, \ldots, \alpha_m$) is determined, m being an integer greater than or equal to 1.

The surface error parameters represent the differences in position and/or shape of the measure optical surface and the corresponding surface of the nominal ophthalmic lens.

According to an embodiment of the invention, during the surface errors determining step S4, the method further comprises:
a deformation surface providing step S41,
a composed surface determining step S42, and
a surface error parameter determining step S43.

During the deformation surface providing step S41, at least one deformation surface defined by at least one surface error parameter ($\alpha_j$) is provided.

The deformation surface may correspond to a spherotorus surface defined by a sphere parameter, a cylinder parameter and an axis parameter.

The deformation surface may further correspond to a right circular cone defined by an axis parameter and an angle parameter.

According to an embodiment of the invention, the surface error parameter comprise at least six position parameters, for example three translation parameters ($T_x$, $T_y$, $T_z$) and three rotation parameters ($R_x$, $R_y$, $R_z$) of the at least one manufactured surface of the ophthalmic lens with respect to the nominal surface.

During the composed surface determining step S42, a composed surface is determined by adding the measured manufactured surface and the at least one deformation surface.

During the surface error parameter determining step S43 the values of surface error parameters ($\Delta\alpha_j$) are determined by minimizing the difference between the nominal surface and the composed surface, for example using a damped least squares process.

According to an embodiment, the surface error parameter determining step further comprises a zone determining step in which a zone of interest is determined in the nominal surface and the surface error parameters are determined by minimizing the difference between the nominal surface and the composed surface in the zone of interest.

During the optical parameter determining step S5, each optical parameter of the set of optical parameters is determined by:

$$P_i = P_{i,0} + \left[\sum_{j=1}^{m} \left(\frac{\partial P_i}{\partial \alpha_j}\right)_0 \times \Delta\alpha_j\right] + A_i$$

with Pi the value of the ith optical parameter of the manufactured optical lens, $P_{i,0}$ the value of the ith optical parameter of the nominal optical lens, $$\left(\frac{\partial P_i}{\partial \alpha_j}\right)_0$$

the value of the derivative of $P_i$ with respect to the jth surface error parameter $\alpha_j$ on the nominal surface and $\Delta\alpha_j$ the value of the jth surface error parameter, and $A_i$ a combination of terms of order greater or equal to 2 for each $P_i$.

According to an embodiment of the invention, $$A_i = \frac{1}{2}\left[\sum_{j,k=1}^{m} \left(\frac{\partial^2 P_i}{\partial \alpha_j \partial \alpha_k}\right)_0 \times \Delta\alpha_j \times \Delta\alpha_k\right]$$

with the value of the second derivative of $P_i$ with respect to the jth surface error parameter $\alpha_j$ and the kth surface error parameter $\alpha_k$ on the nominal surface, $\Delta\alpha_j$ the value of the jth surface error parameter and $\Delta\alpha_k$ the value of the kth surface error parameter.

In other words, during the optical parameter determining step at least part, for example all, of the optical parameters are determined by:

$$P_i = P_{i,0} + \sum_{j=1}^{m} \left(\frac{\partial P_i}{\partial \alpha_j}\right)_0 \times \Delta\alpha_j + \frac{1}{2}\left[\sum_{j,k=1}^{m} \left(\frac{\partial^2 P_i}{\partial \alpha_j \partial \alpha_k}\right)_0 \times \Delta\alpha_j \times \Delta\alpha_k\right].$$

According to an embodiment of the invention, during the optical parameter determining step at least part, for example all, of the optical parameters are determined by having $A_i=0$, i.e.

$$P_i = P_{i,0} + \left[\sum_{j=1}^{m} \left(\frac{\partial P_i}{\partial \alpha_j}\right)_0 \times \Delta\alpha_j\right].$$

Calculating partial derivative of Pi at any order can be very time-consuming. Depending to the optical performance it is advantageous to limit the order of the calculus of the partial derivative of $P_i$ to the minimum necessary.

EXAMPLE 1

The inventors have implemented the method according to the invention to determine the influence of a set of surface errors over a set of optical parameters for a given an ophthalmic lens.

In this example the ophthalmic lens is a progressive addition lens. The front surface of the ophthalmic lens has a base curve of 5.5 diopters, an Addition of 2.0 diopters and a "Comfort Varilux" design.

The back surface of the optical lens is spherical and arranged to provide at the near vision point an ophthalmic prescription of 2.0 diopters of sphere, 0 diopter of cylinder and 0° of Axis.

The optical lens is made of an Orma material having a refractive index of 1.502.

The thickness of the optical lens is of at least 0.8 mm along a circle of 60 mm of diameter centered on the prism reference point of the ophthalmic lens. The thickness of the optical lens at the prism reference point is greater than 2.5 mm.

The inventors have chosen to consider the following positioning errors among the surface errors:

D_Tx the translation positioning error of the back surface of the ophthalmic lens relative to the front surface of the ophthalmic lens along the x axis, D_Ty the translation positioning error of the back surface of the ophthalmic lens relative to the front surface of the ophthalmic lens along the y axis, D_Tz the translation positioning error of the back surface of the ophthalmic lens relative to the front surface of the ophthalmic lens along the z axis, D_Rx the rotation positioning error of the back surface of the ophthalmic lens relative to the front surface of the ophthalmic lens about the x axis, D_Ry the rotation positioning error of the back surface of the ophthalmic lens relative to the front surface of the ophthalmic lens about the y axis, and D_Rz the rotation positioning error of the back surface of the ophthalmic lens relative to the front surface of the ophthalmic lens about the z axis.

The inventors have further decided to consider the tilting errors among the surface errors by adding to the back surface:

a D_xx error corresponding to the term $(x/R)^2$ with R the radius of the surface, a D_xy error corresponding to the term $(x/R)*(y/R)$ with R the radius of the surface, and a D_yy error corresponding to the term $(y/R)^2$ with R the radius of the surface.

The optical effects of the above mentioned surface errors have been evaluated on far vision optical parameters and near vision optical parameters.

Among the far vision optical parameters, the inventors have decided to consider the mean optical power at the far vision point with different orientations from the axis of minimum power:

an orientation of 45°: Pfv_45, an orientation of 30°: Pfv_30, and an orientation of 60°: Pfv_60.

Among the near vision optical parameters, the have decided to consider the mean optical power at the near vision point with different orientations from the axis of minimum power:

an orientation of 45°: Pnv_45, an orientation of 30°: Pnv_30, and an orientation of 60°: Pnv_60.

The optical prismatic effect of the above mentioned surface errors have also been evaluated at the prism reference point of the ophthalmic lens by considering the horizontal prismatic deviation at the prism reference point Dh_prp and the vertical prismatic deviation at the prism reference point Dv_prp.

In this example, for each optical parameter $P_i$ the value of the derivative of $P_i$ with respect to the each surface error parameters has been evaluated.

The result of such evaluation is summarized in FIG. 10.

The table of FIG. 10 can be used to determine the optical properties of a manufactured ophthalmic lens based on measured surface errors.

Typically, when the ophthalmic lens has been manufactured, one may measure the surface errors D_Tx, D_Ty, D_Tz, D_Rx, D_Ry, D_Rz, D_xx, D_xy and D_yy and estimate the expected value of the optical parameters using the table of FIG. 10.

For example, the difference between the nominal value of the average optical power at the far vision point Pfv_45.0 and the obtained value of said average optical power at the far vision point Pfv_45 can be estimated to be equal to: 2.28E-05*D_Tx+7.40E-03*D_Ty−1.73E-02*D_Tz+2.39E-02*D_Rx+3.40E-05*D_Ry+2.08E-06*D_Rz−5.69E-01*D_xx+2.46E-05*D_xy−5.77E-01*D_yy.

Therefore, by measuring surface error one may determine optical properties of a manufactured ophthalmic lens.

The table provided in FIG. 10 can also be use line by line so as to determine for each surface error the most impacted optical parameters.

For example, the considering the tilting errors D_xx, D_xy and D_yy when analyzing the table of FIG. 10 line by line it appears that such tilting errors of the back surface of the lens have a small impact on the horizontal and vertical prismatic deviations whereas the same tilting error have a great impact on the value of the optical powers at the near and far vision points.

The table of FIG. 10 may also be used row by row so as to determine the surface errors that influence the most a given optical parameter.

For example, when considering the table of FIG. 10, it appears that the optical power parameters Pfv_45, Pfv_30, Pfv_60, Pnv_45, Pnv_30 and Pnv_60 are influenced mainly by the tilting errors D_xx, D_xy and D_yy.

Furthermore, the horizontal prismatic deviation at the prism reference point Dh_prp appears to be much influenced by D_Tx the translation positioning error of the back surface of the ophthalmic lens relative to the front surface of the ophthalmic lens along the x axis and also by;

D_Ry the rotation positioning error of the back surface of the ophthalmic lens relative to the front surface of the ophthalmic lens about the y axis.

EXAMPLE 2

The inventors have further implemented the method according to the invention to with a progressive addition lens similar to the one of example 1 with a front surface of the ophthalmic lens has a base curve of 5.5 diopters, an Addition of 3.5 diopters and a "Comfort Varilux" design.

The back surface of the optical lens is spherical and arranged to provide at the near vision point an ophthalmic prescription of 0 diopter of sphere, 3 diopters of cylinder and 30° of Axis.

The optical lens is made of an Orma material having a refractive index of 1.502.

The thickness of the optical lens is of at least 0.8 mm along a circle of 60 mm of diameter centered on the prism reference point of the ophthalmic lens. The thickness of the optical lens at the prism reference point is of at least 2.5 mm.

The optical parameters and the surface errors are the same as for example 1. As in example 1, for each optical parameter $P_i$ the value of the derivative of $P_i$ with respect to the each surface error parameters has been evaluated.

The result of such evaluation is summarized in FIG. 11.

Differences appear between example 1 and example 2. For example, one may observe that for the ophthalmic lens according to example 1, the translation positioning error D_Tx of the back surface of the ophthalmic lens relative to the front surface of the ophthalmic lens along the x axis has a very small impact on the vertical prismatic deviation at the prism reference point Dv_prp whereas the same translation positioning error D_Tx of the back surface of the ophthalmic lens relative to the front surface of the ophthalmic lens along the x axis has a great impact on the vertical prismatic deviation at the prism reference point Dv_prp of the ophthalmic lens according to example 2.

The invention has been described above with the aid of embodiments without limitation of the general inventive concept. In particular the method according to the invention can be used for double surfacing manufacturing process, i.e. processes during which both the front and back surfaces of the ophthalmic lens are machined.

The invention claimed is:

1. A method for determining the values of a set of n optical parameters $(P_1, P_2, \ldots, P_n)$ of an ophthalmic lens to be manufactured, n being an integer greater than or equal to 1, the method comprising:

an ophthalmic lens data providing step during which data representing an ophthalmic lens is provided, including data corresponding to a surface of the ophthalmic lens;

an ophthalmic lens manufacturing step during which an ophthalmic lens is manufactured, the ophthalmic lens comprising at least two optical surfaces at least one of which is manufactured based on the data of the corresponding surface of the ophthalmic lens;

an optical surface measuring step during which the at least one manufactured surface of the ophthalmic lens is measured;

a surface errors determining step during which a set of m surface error parameters $(\alpha_1, \alpha_2, \ldots, \alpha_m)$ is determined, m being an integer greater than or equal to 1, the surface error parameters representing the differences in position and/or shape of the measured optical surface and the corresponding surface of the ophthalmic lens; and an optical parameter determining step during which each optical parameter of the set of optical parameters is determined by:

$$P_i = P_{i,0} + \left[ \sum_{j=1}^{m} \left( \frac{\partial P_i}{\partial \alpha_j} \right)_0 \times \Delta\alpha_j \right] + A_i$$

with $P_i$ the value of the ith optical parameter of the manufactured optical lens, $P_{i,0}$ the value of the ith optical parameter of the ophthalmic lens to be manufactured, $$\left( \frac{\partial P_i}{\partial \alpha_j} \right)_0$$

the value of the derivative of $P_i$ with respect to the jth surface error parameter $\alpha_j$ on the surface and $\Delta\alpha_j$ the value of the jth surface error parameter, and $A_i$ a combination of terms of order greater or equal to 2 for each $P_i$.

2. The method according to claim 1, wherein during the optical parameter determining step at least some of the optical parameters are determined by having:

$$A_i = \frac{1}{2} \left[ \sum_{j,k=1}^{m} \left( \frac{\partial^2 P_i}{\partial \alpha_j \partial \alpha_k} \right)_0 \times \Delta\alpha_j \times \Delta\alpha_k \right]$$

with $$\left( \frac{\partial^2 P_i}{\partial \alpha_j \partial \alpha_k} \right)_0$$

the value of the second derivative of $P_i$ with respect to the jth surface error parameter $\alpha_j$ and the kth surface error parameter $\alpha_k$ on the surface, $\Delta\alpha_j$ the value of the jth surface error parameter and $\Delta\alpha_k$ the value of the kth surface error parameter.

3. The method according to claim 1, wherein during the optical parameter determining step at least some of the optical parameters are determined by having $A_i=0$.

4. The method according to claim 1, wherein at least one optical parameter is determined under specific conditions defined by at least a reference point out of the ophthalmic lens and the position and orientation of the ophthalmic lens with respect to the reference point.

5. The method according to claim 1, wherein the ophthalmic lens is adapted for a wearer and at least one optical parameter is determined under given wearing conditions defined by at least a position of one of the surfaces of the ophthalmic lens with respect to a position of the center of rotation of the eye of the wearer and a pantoscopic angle and a wrap angle of the ophthalmic lens.

6. The method according to claim 5, wherein the wearing conditions are defined from measurements on the wearer and a spectacle frame chosen by the wearer.

7. The method according to claim 1, wherein at least one optical parameter is a local optical parameter selected from among the list consisting of: spherical power, astigmatism amplitude and axis, vertical prismatic deviation, horizontal prismatic deviation, and total prismatic deviation.

8. The method according to claim 1, wherein at least one optical parameter is a global optical parameter being a parameter determined on a zone corresponding to the intersection of a cone and one of the surfaces of the ophthalmic lens.

9. The method according to claim 1, wherein:
the ophthalmic lens data represent the ophthalmic lens in a frame of reference of the ophthalmic lens, and
the measured manufactured surface of the ophthalmic lens is expressed in the frame of reference.

10. The method according to claim 9, wherein the ophthalmic lens is adapted for a wearer and the frame of reference is linked to the wearer.

11. The method according to claim 9, wherein during the surface errors determining step, the method further comprises:
a deformation surface providing step during which at least one deformation surface defined by at least one surface error parameter ($\alpha_j$) is provided;
a composed surface determining step during which a composed surface is determined by adding the measured manufactured surface and the at least one deformation surface; and
a surface error parameter determining step during which the values of surface error parameters ($\Delta\alpha_j$) are determined by minimizing the difference between the surface and the composed surface.

12. The method according to claim 9, wherein the surface error parameters comprise at least six position parameters of the at least one manufactured surface of the ophthalmic lens with respect to the surface.

13. The method according to claim 9, wherein the deformation surface corresponds to a sphero-torus surface defined by a sphere parameter, a cylinder parameter and an axis parameter.

14. The method according to claim 9, wherein the deformation surface corresponds to a right circular cone defined by an axis parameter and an angle parameter.

15. A method for controlling a lens manufacturing process comprising the steps of:
a) manufacturing a master lens according to a manufacturing process using a manufacturing device;
b) determining by the method according to claim 1 at least one optical parameter of the master lens of step a);
c) recording the value of the at least one optical parameter of the master lens;
d) comparing the recorded value of the at least one optical parameter of the master lens to a corresponding predetermined value of the at least one optical parameter; and
e) repeating regularly step a) to d) and monitoring values of the at least one optical parameter of the master lens over time,
wherein changes of at least one parameter of the manufacturing device used during the lens manufacturing process is monitored over time in relation to changes over time of the at least one optical parameter of the master lens as compared to the corresponding predetermined value of the at least one parameter.

* * * * *